United States Patent
Yamashita et al.

[11] Patent Number: 6,087,776
[45] Date of Patent: *Jul. 11, 2000

[54] DISCHARGE LAMP LIGHTING CIRCUIT WITH PROTECTION CIRCUIT

[75] Inventors: Masayasu Yamashita; Atsushi Toda; Jun Yabuzaki, all of Shizuoka, Japan

[73] Assignee: Koito Manufacturing Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/006,883

[22] Filed: Jan. 14, 1998

[30]     Foreign Application Priority Data

Jan. 14, 1997  [JP]  Japan ..................................... 9-015963

[51] Int. Cl.⁷ ....................................................... B60Q 1/02
[52] U.S. Cl. ...................... 315/82; 315/307; 315/DIG. 7; 315/225
[58] Field of Search ............................. 315/82, 224, 225, 315/DIG. 7, 307, 308

[56]             References Cited

U.S. PATENT DOCUMENTS

| | | | |
|---|---|---|---|
| 5,068,570 | 11/1991 | Oda et al. | 315/128 |
| 5,140,229 | 8/1992 | Yagi et al. | 315/307 |
| 5,142,203 | 8/1992 | Oda et al. | 315/308 |
| 5,151,631 | 9/1992 | Oda et al. | 315/127 |
| 5,177,397 | 1/1993 | Nagasawa et al. | 313/318 |
| 5,212,428 | 5/1993 | Sasaki et al. | 315/308 |
| 5,278,452 | 1/1994 | Matsumoto et al. | 307/10.8 |
| 5,295,036 | 3/1994 | Yagi et al. | 361/79 |
| 5,422,548 | 6/1995 | Yamashita et al. | 315/308 |
| 5,438,480 | 8/1995 | Yamashita | 361/760 |
| 5,449,973 | 9/1995 | Yamashita et al. | 315/82 |
| 5,485,059 | 1/1996 | Yamashita et al. | 315/307 |
| 5,486,740 | 1/1996 | Yamashita et al. | 315/308 |
| 5,514,935 | 5/1996 | Oda et al. | 315/82 |
| 5,565,743 | 10/1996 | Yamashita et al. | 315/310 |
| 5,572,094 | 11/1996 | Yamashita et al. | 315/308 |
| 5,629,588 | 5/1997 | Oda et al. | 315/308 |
| 5,663,613 | 9/1997 | Yamashita et al. | 315/308 |
| 5,751,115 | 5/1998 | Jayaraman et al. | 315/225 |

*Primary Examiner*—Michael B Shingleton
*Attorney, Agent, or Firm*—Sughrue, Mion, Zinn, Macpeak & Seas, PLLC

[57]            ABSTRACT

A discharge lamp lighting circuit which, in turning on a discharge lamp, when an abnormal condition occurs in a discharge lamp or in the present discharge lamp lighting circuit due to a transient cause, can resume the power supply to the discharge lamp at the time when the present transient abnormal condition cause disappears. The discharge lamp lighting circuit includes lighting control for controlling the lighting of a discharge lamp, an abnormal condition detector for detecting an abnormal condition occurring in the discharge lamp or in the discharge lamp lighting circuit, and a protection circuit which receives a signal from the abnormal condition detector to thereby stop the power supply to the discharge lamp. The protection circuit is composed of first protection unit and second protection unit. When a permanent abnormal condition is detected in the discharge lamp or in the discharge lamp lighting circuit, the power supply to the discharge lamp is cut off by the first protection unit and such cutoff condition of the power supply is also held. Also, when a transient abnormal condition is detected in the discharge lamp or in the discharge lamp lighting circuit, the power supply to the discharge lamp is cut off by the second protection unit and, after then, when the present abnormal condition is no longer detected, the power supply cutoff condition is removed to thereby resume the power supply to the discharge lamp. Further, while the power supply to the discharge lamp is being cut off by the second protection unit, the operation of the first protection unit is prevented from cutting off the power supply to the discharge lamp and holding such power supply cutoff condition.

17 Claims, 3 Drawing Sheets

DISCHARGE LAMP LIGHTING CIRCUIT WITH PROTECTION CIRCUIT

FIELD OF THE INVENTION

The present invention relates to a discharge lamp lighting circuit having a protection circuit which, when an error or abnormal condition is detected in a discharge lamp or in the discharge lamp lighting circuit, protects the discharge lamp or discharge lamp lighting circuit.

DESCRIPTION OF THE BACKGROUND ART

Conventionally, a discharge lamp lighting circuit is structured such that, when an error occurs in the discharge lamp or in the circuit operation of the discharge lamp lighting circuit, the power supply to the discharge lamp is cut off by a protection circuit provided therein.

Conventionally, a discharge lamp lighting circuit which incorporates a protection function when an abnormal condition has occurred (for example, when an error in a load voltage or current due to the limited life of the discharge lamp is detected, that is, when the cause of an abnormal condition is considered to be permanent), the power supply to the discharge lamp is cut off. By contrast, when the cause of an abnormal condition is believed transient (for example, a transient variations in the power supply voltage or the like), the power supply to the discharge lamp is temporarily cut off but, thereafter, at the time when the cause for the abnormal condition disappears, the power supply to the discharge lamp is resumed.

However, when the abnormal condition cause is transient, if the power supply to the discharge lamp is cut off, then there is a concern that the resultant variations in the circuit condition (such as the lowered output voltage value and output current value of the lighting circuit) can be judged in error to be caused by a permanent abnormal condition.

For example, when the power supply to the discharge lamp is cut off temporarily due to a transient abnormal condition, the discharge lamp must be able to receive the supply of power again in the future when the cause of the transient abnormal condition disappears. However, if the protection circuit erroneously confirms that a secondary abnormal condition is produced due to the power supply cutoff condition, and also judges that the cause of the abnormal condition is a lasting or permanent cause, the supply of power to the discharge lamp will not be resumed.

SUMMARY OF THE INVENTION

In view of the above, it is an object of the invention to provide a discharge lamp lighting circuit which, when an abnormal condition occurs due to a transient abnormal condition, is able to resume the supply of power to the discharge lamp at the time when the cause of the transient abnormal condition disappears.

In attaining the above object, according to the invention, a discharge lamp lighting circuit has a protection circuit, characterized in that: the protection circuit comprises first protection means which, when a permanent abnormal condition is detected in the discharge lamp or in the present lighting circuit by abnormal condition detect means, cuts off the power supply to the discharge lamp and also holds such power supply cutoff condition, and second protection means which, after a transient abnormal condition is detected in the discharge lamp or in the lighting circuit by the abnormal condition detect means and the power supply to the discharge lamp is thereby cut off, at the time when the existing abnormal condition cannot be detected any longer by the abnormal condition detect means, removes the power supply cutoff condition and resumes the power supply to the discharge lamp, Further, while the power supply to the discharge lamp is cut off by the second protection means, the cutting-off of the power supply to the discharge lamp and the holding of the power supply cutoff condition by the first protection means are prohibited.

Therefore, according to the invention, while the power supply to the discharge is being cut off by the second protection means due to occurrence of the transient abnormal condition in the discharge lamp or in the lighting circuit, there is no possibility that the first protection means can hold the cutoff condition of the power supply to the discharge lamp. In short, during a power supply cutoff condition by the second protection means, the function of the first protection means is prohibited.

DESCRIPTION OF THE PREFERRED EMBODIMENT

Figure 1:
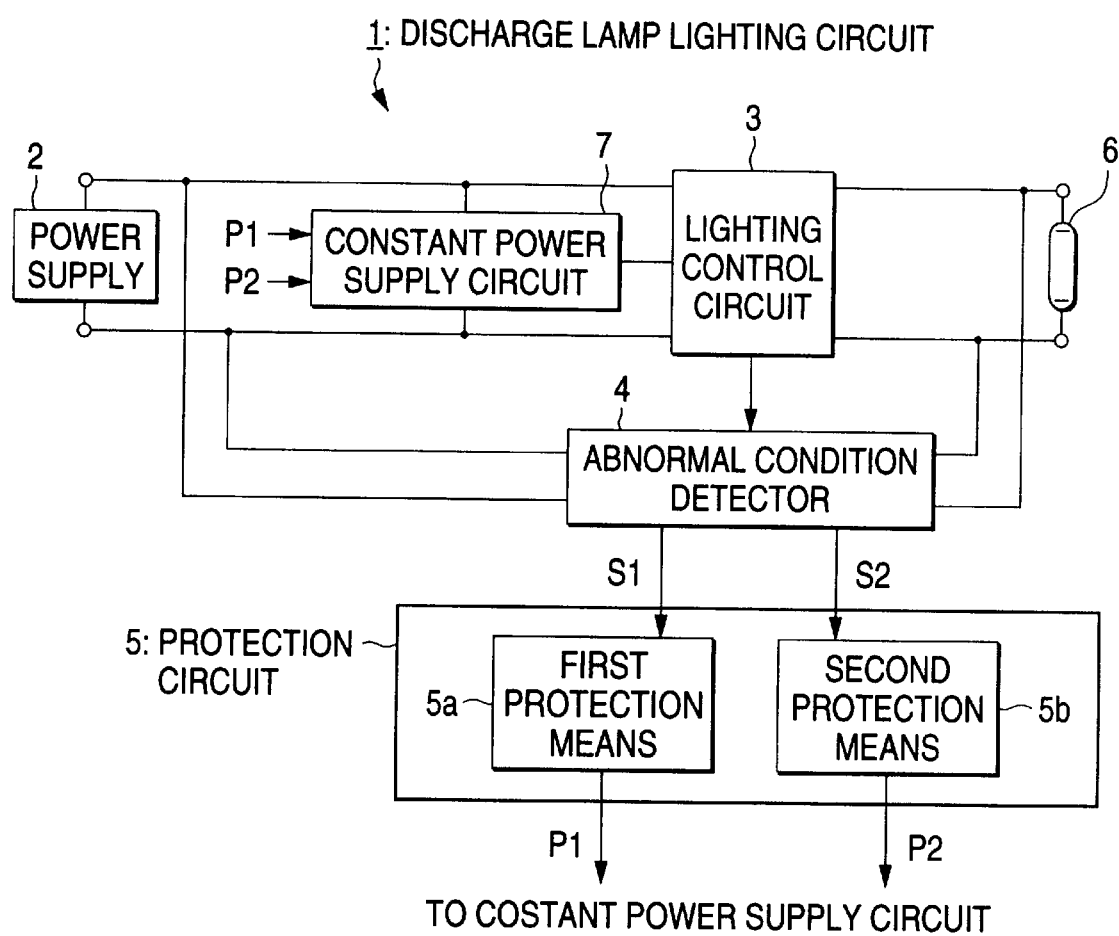
FIG. 1 is a block diagram of the basic structure of a discharge lamp lighting circuit according to the invention.

FIG. 1 is a block diagram of the basic structure of a discharge lamp lighting circuit 1 according to the present invention, which comprises a power supply 2, lighting control 3, abnormal condition detector 4, and a protection circuit 5.

The lighting control 3 controls the electric power of a discharge lamp 6 (such as a metal halide lamp or the like) based on a power supply voltage from the power supply 2. The lighting control 3 employs a known system (such as a sine wave lighting system, a rectangular wave lighting system, or the like). In particular, the lighting control 3 carries out a control operation to effect the emission of light by the discharge lamp 6 first by supplying electric power exceeding the rated electric power of the discharge lamp in the early lighting stage of the discharge lamp 6, and then providing an electric power control operation that effects on the steady lighted condition of the discharge lamp 6. A start pulse generator (that is, a so called igniter ), which is used to generate a start pulse when the discharge lamp 6 is to be turned on, is also included in this lighting control 3.

The abnormal condition detector 4 is used to detect the abnormal condition of the discharge lamp 6 or lighting circuit 1. Specifically, the abnormal condition detector 4 judges whether or not an abnormal condition has occurred in the discharge lamp 6 or in the lighting circuit 1 on the basis of an input voltage and an input current to the lighting control 3 or the lamp voltage and lamp current of the discharge lamp 6. Alternatively, signals in the interior portion of the lighting control 3, which correspond to the above-mentioned voltages and currents (for example, when the lighting control 3 includes therein a dc voltage boosting and lowering circuit, the signals of the output voltage and output current of the dc voltage boosting and lowering circuit), may be detected.

When the abnormal condition of the discharge lamp or the lighting circuit is detected by the abnormal condition detector 4, the power supply to the discharge lamp 6 is stopped due to a signal sent from the abnormal condition detector 4 to the discharge lamp 6. The detected signal of the abnormal condition detector 4 includes two kinds of signals as follows:

(I) a signal to be output when it is judged that the abnormal condition is caused by a permanent abnormal condition (which signal is hereinafter referred to as S1); and, (II) a signal to be output when it is judged that the abnormal condition is caused by a transient abnormal condition (which signal is hereinafter referred to as S2).

The signal (S1) is a signal that is output when an abnormal condition is detected which, if the cause for this abnormal condition is left as it is, can cause the discharge lamp or the lighting circuit to be damaged seriously or broken. The signal (S1) is a detect signal mainly relating to the lighting circuit or discharge lamp, each being disposed downstream of the input stage of the lighting control 3. For example, the signal S1 is to be sent to the protection circuit 5 when the abnormal condition detector 4 detects any one of several abnormal conditions. For example, when the discharge lamp 6 is not connected to the output terminal of the lighting circuit 1; when the output terminal of the lighting circuit 1 is open; when the discharge lamp 6 approaches the end of its life, with the result that the lamp voltage exceeds the rated voltage range; when the lamp voltage is unable to reach the rated voltage range due to a leakage or the like of the sealed component of the discharge lamp 6 to the outside of the lamp; when the lamp voltage is unable to reach the rated voltage range because part of the component material of a discharge electrode is released and attaches to the lamp wall; when something (such as water or the like) other than the discharge lamp is connected or contacted between the output terminals of the lighting circuit 1; and, when the output terminal of the lighting circuit 1 is shorted.

The signal (S2) is a signal that is output when an abnormal condition is caused by a transient event which has a relatively high likelihood that it will disappear in the future. The signal (S2) is a detect signal which is applied to the input stage side of the lighting control 3. Specifically, the signal S2 is sent to the protection circuit 5, for example, when an input voltage or an input current from the power supply 2 to the lighting control 3 temporarily is excessive or is abnormally lowered.

When the abnormal condition indicated by the (S1) signal exists for an extended period, the discharge lamp and lighting circuit may be jeopardized, there may be adverse effects on humans, and there may be secondary accidents. For example, the continuous application of the high voltage start pulse to the output terminal of the lighting circuit 1 can produce an electromagnetic interference noise that effects peripheral devices, or can enhance a danger of bringing about an electric shock accident, or the like. Therefore, in this case, it is preferred that the power supply to the discharge lamp should be cut off immediately and such power supply cutoff condition should be held until the next supply of power is applied. On the other hand, in the case of the abnormal condition indicated by the signal (S2), since it is expected that the abnormal condition can be returned to a normal condition, the supply of power to the discharge lamp may be resumed as soon as the abnormal condition is returned to the normal condition. For example, in a vehicle lighting device using a discharge lamp as a light source thereof, for a transient abnormal condition that occurs during night driving, it is desirable to cut off the power supply to the discharge lamp when the abnormal condition occurs and to turn on the discharge lamp again as soon as the abnormal condition is returned to a normal condition. This is preferred to cutting off the power supply to the discharge lamp when the abnormal condition occurs and holding such power supply cutoff condition.

The protection circuit 5 includes first protection unit 5a and second protection unit 5b. In particular, when the first protection unit 5a receives the signal S1, the power supply to the discharge lamp 6 is cut off and such power supply cutoff condition is held. When the second protection unit 5b receives the signal S2, the power supply to the discharge lamp 6 is cut off and, after then, when the abnormal condition no longer is detected, the power supply cutoff condition is removed and the power supply to the discharge lamp 6 is resumed.

To cut off or resume the power supply to the discharge lamp 6, for example, a switching device (such as a relay contact, a semiconductor switch, or the like) is provided on a power feed line from the power supply 2 to the lighting control 3, and the switching device is controlled to turn on and off, thereby cutting off or resuming the power supply. With this approach, preferably, there may be provided a constant power supply circuit 7 for generating a predetermined constant power supply voltage based on the power supply 2. Thus, when an abnormal condition is detected in the discharge lamp or in the lighting circuit by the abnormal condition detect or 4, by stopping the operation of the constant power supply circuit 7 by means of a signal to be sent from the first protection unit 5a to the constant power supply circuit 7 (which signal is expressed as P1) or by means of a signal from the second protection unit 5b to the constant power supply circuit 7 (which signal is A expressed as P2), or by cutting off a power supply output from the constant power supply circuit 7 to the lighting control 3, the power supply to the discharge lamp 6 may be cut off. With this arrangement, not only will then be no problem relating to the contact capacity and endurance of the switching unit, the control of the power supply to the discharge lamp 6 can be carried out in a relatively simple manner without making the circuit configuration complicated or incurring a great increase in the cost of the lighting circuit.

In the protection circuit 5, while the power supply to the discharge lamp 6 is being cut off by the second protection unit 5b, the cutoff of the power supply to the discharge lamp 6 by the first protection unit 5a and the holding of the present cutoff condition by the first protection unit 5a are both prohibited. That is, while the operation of the constant power supply circuit 7 is being stopped by the signal P2 or the power supply output from the constant power supply circuit 7 to the lighting control 3 is being cut off, the signal P1 must not be used.

Consequently, when the signal S2 from the abnormal condition detect or 4 is sent to the second protection unit 5b and the signal P2 is then sent from the second protection unit 5b to the constant power supply circuit 7, the power supply to the discharge lamp 6 is simply cut off temporarily. However, as a result of this, even if the abnormal condition detect or 4 sends the signal S1 to the first protection unit 5a, the cutoff condition of the power supply to the discharge lamp 6 is not to be held by the signal P1. Thanks to this, the power supply to the discharge lamp 6 can be resumed at the time when the abnormal condition that relates to the signal S2 disappears.

There are two methods, while the power supply to the discharge lamp is being temporarily cut off by the second protection unit 5b, that can prevent the first protection unit 5a from performing an operation to hold the cutoff condition of the power supply. Specifically:

(a) a method for cutting off the power supply to the first protection unit; and, (b) a method for ignoring the signal P1 by the first protection unit.

Figure 2:
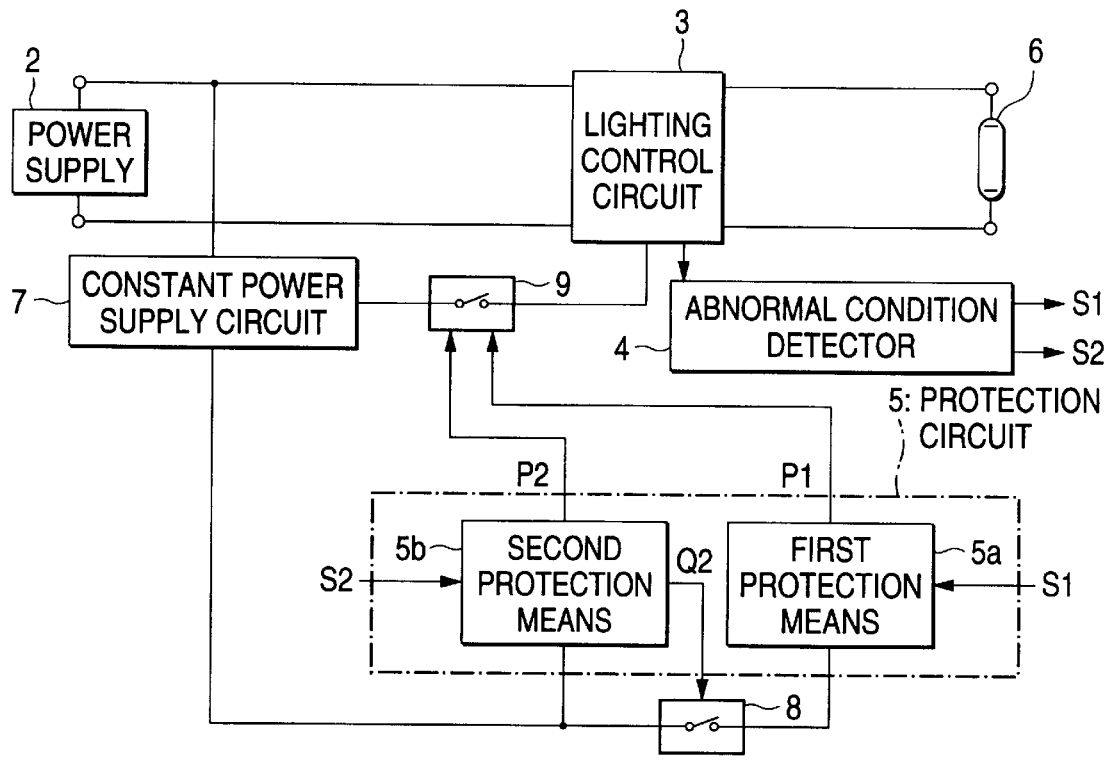
FIG. 2 is a block diagram of a discharge lamp lighting circuit according to the invention, illustrating how, while power supply to a discharge lamp is being cut off by second protection means, power supply to first protection means is cut off so that the first protection means is prevented from holding the cutoff condition of the power supply to the discharge lamp.

The method (a) cuts off the power to the first protection unit 5a from the constant power supply circuit 7 to thereby prohibit the operation of the first protection unit 5a. For example, as shown in FIG. 2 (in this figure, a bold line designates a power supply line, whereas a fine line with an arrow stands for a signal line), a given supply voltage is directly supplied from the constant power supply circuit 7 to the second protection unit 5b, while a given power supply voltage is supplied from the constant power supply circuit 7 to the first protection unit 5a through switching unit 8 (such as a semiconductor switching element or the like). The switching unit 8 is arranged such that it can be turned on/off by a control signal to be sent from the second protection signal 5b to the switching unit 8 (which signal is expressed as Q2).

Further, on the power feed line from the constant power supply circuit 7 to the lighting control 3, there may be provided another switching unit 9 (such as a semiconductor switching element or the like) in such a manner that the switching unit 9 can be turned on/off by the above-mentioned signal P1 or P2, and the above-mentioned signals Q2 and P2 may be synchronized with each other. With use of this arrangement, if the signals P2 and Q2 are both on-signals, then the switching units 8 and 9 are turned off, so that not only the power supply from the constant power supply circuit 7 to the lighting control 3 is cut off to thereby stop the power supply to the discharge lamp 6 temporarily, but also the power supply from the constant power supply circuit 7 to the protection unit 5a is cut off. As a result, there is eliminated the possibility that the cutoff condition of the power supply to the discharge lamp 6 can be held by the first protection unit 5a.

According to the present method, when the second protection unit 5b is in operation, the power supply to the first protection unit 5a may be cut off easily. That is, use of the present method provides an advantage that the circuit configuration is relatively simple.

Figure 3:
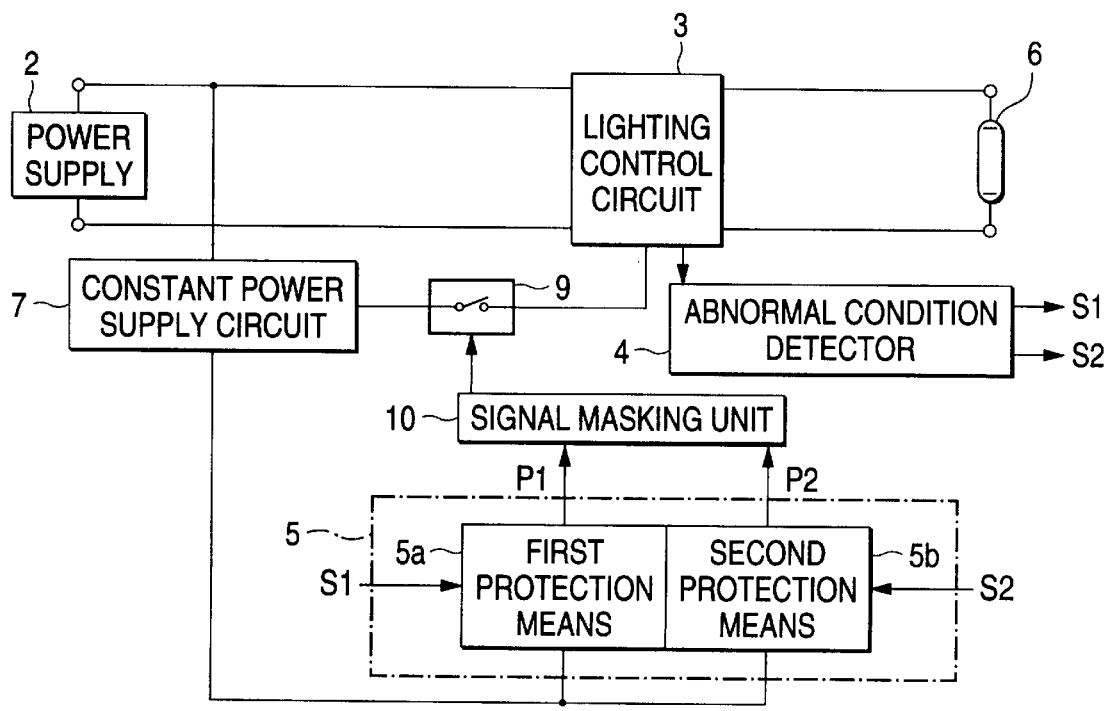
FIG. 3 is a block diagram of a discharge lamp lighting circuit according to the invention, illustrating how, while the power supply to the discharge lamp is being cut off by the second protection means, a signal output by the first protection means is ignored so that the first protection means is prevented from holding the cutoff condition of the power supply to the discharge lamp.

Turning next to, the other method (b), when the power supply to the discharge lamp 6 is being cut off by the second protection unit 5b, even if the first protection unit 5a receives the signal S1 from the abnormal condition detect or 4 and thus issues the signal P1, the signal P1 is ignored to thereby eliminate the possibility that the cutoff condition of the power supply to the discharge lamp 6 can be held. For example, as shown in FIG. 3 (in this figure, a bold line designates a power supply line, whereas a fine line with an arrow stands for a signal line), the circuit is structured such that the same power supply voltage can be supplied from the constant power supply circuit 7 to the first protection unit 5a and second protection unit 5b, and, there is interposed signal masking unit 10 between the first and second protection units 5a and 5b. And, when the signal masking unit 10 receives an on signal relating to the signal P2, that is, a signal indicating the temporary interruption of the power to the discharge lamp, even if the signal masking unit 10 receives an on signal relating to the signal P1, after then, the signal masking unit 10 ignores the present on signal but sends out a signal synchronized with the signal P2 to the switching unit 9 to thereby control the on/off of the switching unit 9. Also, when the signal masking unit 10 firstly receives an on signal relating to the signal P1, that is, a signal indicating the cutting-off of the power supply to the discharge lamp 6 and the holding of this power supply cutoff condition, even if the signal masking unit 10 receives an on signal relating to the signal P2, after then the signal masking unit 10 ignores the present on signal but sends out a signal synchronized with the signal P1 to the switching unit 9 to thereby turn off the switching unit 9 and also to hold the present turn-off condition.

Accordingly, when the power supply to the discharge lamp 6 is stopped temporarily by the signal P2, the signal P1 is ignored by the signal masking unit 10, there is eliminated the possibility that the cutoff condition of the power supply to the discharge lamp 6 can be held by the first protection unit 5a.

According to the present method, since there is eliminated the need to cut off the power supply line from the constant power supply circuit 7 to the first protection unit 5a, for example, the same power supply voltage can be supplied stably from the constant power supply circuit 7 to the first and second protection units 5a and 5b, thereby being able to reduce the present circuit in size and cost. That is, the present method is suited to the integration of the protection circuit 5.

Figure 4:
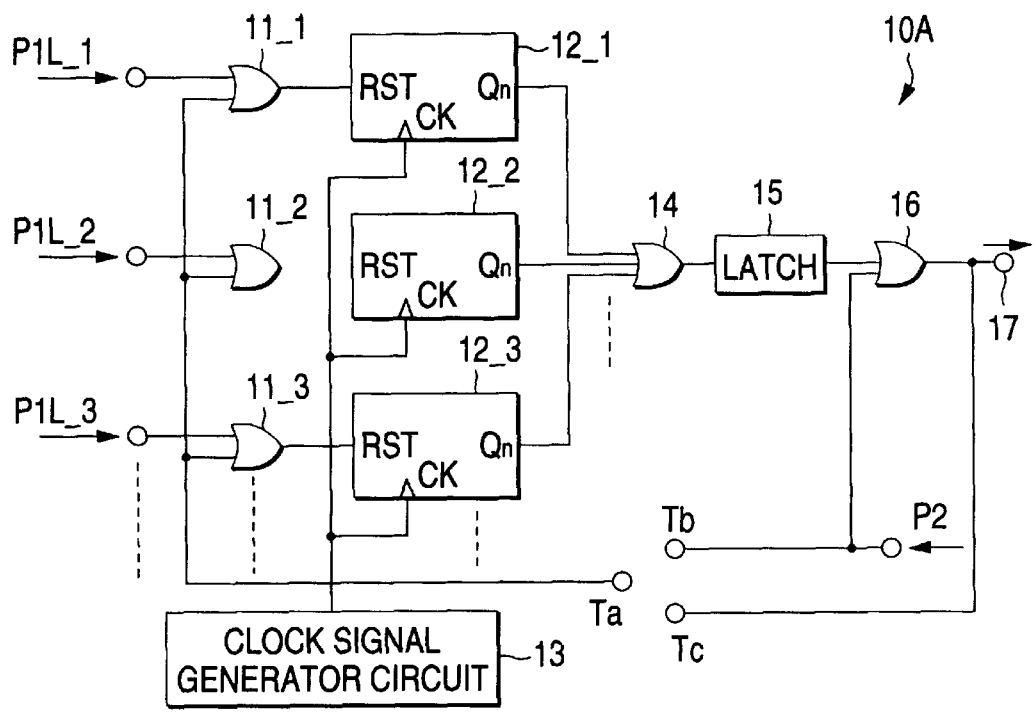
FIG. 4 is a circuit diagram of a structure of signal masking means employing counters.
Figure 5:
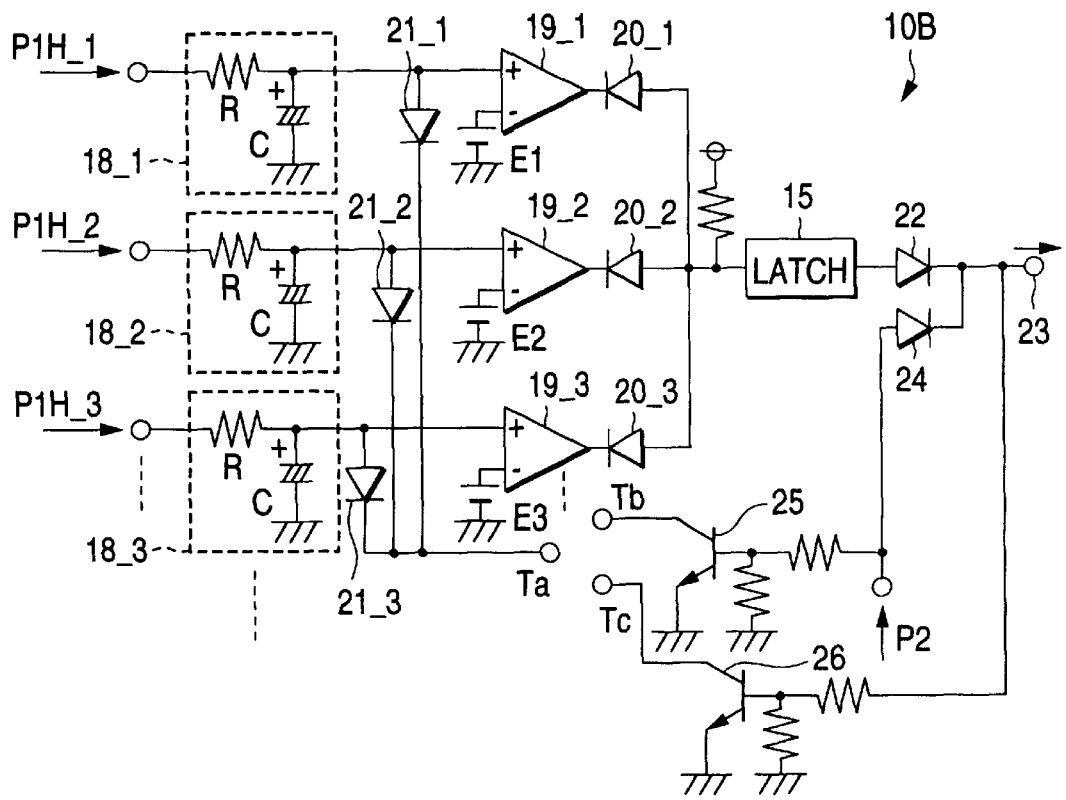
FIG. 5 is a circuit diagram of another structure of the signal masking means employing delay circuits and comparators.

FIGS. 4 and 5 are respectively circuit diagrams of the structures of the signal masking unit 10, showing a case in which there are present a plurality of signals P1, one of which has been described above.

In particular, FIG. 4 shows a structure 10A which is employed when counters are used in the signal masking unit. In FIG. 4, signals P1L__i (i=1,2, - - - ) are signals which are sent respectively according to a plurality of abnormal condition causes from the first protection unit 5a to the signal masking unit 10A (each of which signals provides an L (low) signal when an abnormal condition is detected), and they are respectively input to one input terminal of each of two-input OR (logical sum) gates 11__i (i=1,2, - - - ). The other input terminal of each of the OR (logical sum) gates 11__i (i=1,2, - - - ) is connected to a terminal Ta.

The OR gates 11__i respectively include counters 12__i (i=1,2, - - - ) in the respective rear stages thereof, while the output terminals of the respective OR gates 11__i are respectively connected to the reset terminals (RST) of the respective counters 12__i.

Clock signals, which are output from a clock signal generator circuit 13, are respectively input to the clock input terminals (CK) of the counters 12__i, while the counting results of the counters 12__i are sent out as bit signals of given stages from the output terminals (Qn) of the counters 12__i to a multi-input OR gate 14, in which an OR operation is executed.

Then, the output of the OR gate 14 is sent out through a latch circuit 15 to one input terminal of a two-input OR gate 16. Also, the signal P2 (which provides a H (high) signal when an abnormal condition is detected) from the second protection unit 5b is input to the remaining input terminal of the OR gate 16, while the present signal P2 is also supplied to a terminal Tb.

The output signal of the OR gate 16 taken from a terminal 17, when it provides an H signal, is used to stop the supply of power to the discharge lamp through the constant power supply circuit (not shown). The output signal of the OR gate is also supplied to a terminal Tc.

In the above-mentioned circuit 10A, when the terminals Ta and Tb are connected to each other, if the signal P2 provides an H signal, then the output signal of the OR gate 16 turns into an H signal to thereby stop the power supply to the discharge lamp, and also the signal P2 is supplied through the respective OR gates 11__i to the reset terminals (RST) of the counters 12__i to thereby reset the counters 12__i respectively. As a result, the outputs of the counters are all turned into L signals. That is, when an abnormal condition relating to the condition (II) is detected, since the signals P1L__i are ignored with respect to the counters 12__i, even if the signals P1L__i are turned into L signals, the OR signals of all the counter outputs are L signals, thereby preventing an H signal from being held by the latch circuit 15.

On the other hand, if the signal P2 is an L signal and any one of the signals P1L__i is an L signal, then one of the counters 12__i corresponding to the present one of the signal P1L__i counts the clock signals. After completion of a given counting operation, an H signal is sent from the output terminal (Qn) of the present counter to the OR gate 14 and is then latched by the OR gate 14. As a result of this, the output signal of the OR gate 16 is turned into an H signal, so that the power supply to the discharge lamp is stopped and this stopped condition is held or kept on.

Also, in the above-mentioned circuit, when the terminals Ta and Tc are connected to each other, similarly to the above-mentioned case, if the signal P2 turns into an H signal, then the output signal of the OR gate 16 turns into an H signal to thereby stop the power supply to the discharge lamp, and H signals output from the OR gate are respectively turned through the OR gates 11__i into the reset signals of the counters 12__i, so that the signals P1L__i are ignored. In the present circuit, when the signal P2 is an L signal and any one of the signals P1L__i is an L signal, after completion of a given counting operation by the corresponding one of the counters 12__i, H signals are output through the OR gate 14, latch circuit 15 and OR gate 16 in this order, and they are then turned through the respective OR gates 11__i into the reset signals to be sent to their respective counters 12__i. However, because the H signals are latched by the latch circuit 15, there arises no problem in operation.

Thus, according to the above circuit, when at least the signal P2 is an H signal, even if any one of the signals P1L__i turns into an L signal, there is no possibility that the present signal can be held and, therefore, when the signal P2 turns into an L signal and the signals P1L__i are all H signals, the power supply to the discharge lamp is resumed.

FIG. 5 shows a structure 10B in which the signal masking unit is composed of analog circuits, including a time constant circuit. A plurality of signals P1H__i (i=1, 2, - - - ), which respectively provide H signals when an abnormal condition is detected by the first protection unit 5a, are issued from the first protection unit 5a and, after then, they are respectively input to delay circuits 18__i (i=1, 2, - - - ) which are respectively composed of resistors R and capacitors C, and the outputs of the respective delay circuits 18__i (i=1, 2, - - - ) are respectively sent to the respective positive input terminals of comparators 19__i (i=1, 2, - - - ) which are respectively provided downstream of the respective delay circuits 18__i (i=1, 2, - - - ).

To the negative input terminals of the respective comparators 19__i (i=1, 2, - - - ), there are supplied given reference voltages Ei (i=1, 2, - - - ), while the outputs of the respective comparators 19__i (i=1, 2, - - - ) are sent to the latch circuit 15 through OR circuits which are respectively composed of diodes 20__i (i=1, 2, - - - ). The respective anodes of the diodes 21__i (i=1, 2, - - - ) are connected between the delay circuits 18__i and comparators 19__i respectively provided downstream of the delay circuits 18__i, while the cathodes of the diodes 21__i are connected in common to a terminal Ta.

The output of the latch circuit 15 is taken out from a terminal 23 through a diode 22 and, if the output is an H signal, the power supply to the discharge lamp is stopped through a constant power supply circuit (not shown).

The signal P2 is to be supplied to a diode 24 which is connected in parallel to the diode 22, and an OR circuit is completed by the two diodes 22 and 24.

The signal P2 is also supplied to the base of an NPN transistor 25 with the emitter thereof grounded, while the collector of the transistor 25 is connected to a terminal Tb.

Also, the output of the terminal 23 is supplied to the base of an NPN transistor 26 with the emitter thereof grounded, while the collector of the transistor 26 is connected to a terminal Tc.

In the above-mentioned circuit 10B, when the terminals Ta and Tb are connected to each other, if the signal P2 turns into an H signal, then an H signal is output from the terminal 23 due to conduction of the diode 24 to thereby stop the power supply to the discharge lamp and, at the same time, the signal P2 turns on the transistor 25 to thereby form discharge lines for the respective capacitors C of the delay circuits 18__i through the diodes 21__i, so that the signals P1H__i are ignored with respect to the comparators 19__i. Therefore, even if any one of the signals P1H__i is turned into an H signal, the OR signals of all the comparator outputs are L signals, which eliminates the possibility that any H signal can be held by the latch circuit 15.

On the other hand, when the signal P2 is an L signal and any one of the signals P1H__i is an H signal, since the transistor 25 is off , the output of the corresponding one of the comparators 19__i to the present one of the signals P1H__i providing an H signal causes the diode 20__i to be not in conduction, so that an H signal can be held by the latch circuit 15. As a result of this, an H signal is output from the latch circuit 15 through the diode 22 to the terminal 23, so that the power supply to the discharge lamp is stopped and such stopped condition is held or kept on.

In the above-mentioned circuit, when the terminals Ta and Tc are connected to each other, similarly to the abovementioned case, if the signal P2 turns into an H signal, then an H signal is output from the terminal 23 through the diode 24 to thereby stop the power supply to the discharge lamp and, at the same time, the present H signal turns on the transistor 26 to thereby cause the diodes 21__i and transistor 26 to form discharge lines for the capacitors C of the respective delay circuits 18__i, so that the signals P1H__i are ignored. In the present circuit, when the signal P2 is an L signal and any one of the signals P1H__i is an H signal, an L signal is output to the terminal 23 through the comparators 19__i, diodes 20__i, latch circuit 15 and diode 22 in this order. This turns on the transistor 26 to thereby form the discharge lines for the capacitors C of the respective delay circuits 18__i. However, in this case, since the H signal is held by the latch circuit 15, there arises no problem in operation. Also, in the above description, for the convenience of explanation, in the respective delay circuits 18_i, there are used the same resistors R and capacitors C which have the same resistance values and capacitance. However, of course, the resistance values of the resistors R and the capacitance of the capacitors C can also be set such that they are different in every delay circuit, thereby stipulating the time constants to their respective values.

As can be seen clearly from the foregoing description, according to the invention when a transient abnormal condition occurs in the discharge lamp or in the lighting circuit, while the power supply to the discharge lamp is being cut off by a second protection circuit, there is eliminated the possibility that the cutoff condition of the power supply to the discharge lamp can be held by a first protection circuit. This in turn eliminates the possibility that a change in the circuit condition caused by the cutoff of the power supply to the discharge lamp due to a transient abnormal condition can be judged in error, as if such circuit condition change were caused by a permanent abnormal condition cause. Thus such cutoff condition of the power supply to the discharge lamp can be kept on or held. That is, when the power supply to the discharge lamp is cut off temporarily due to the transient abnormal condition, the discharge lamp is able to receive the power supply again in the future at the time when the present abnormal condition disappears.

Also, according to the invention, when something abnormal is detected in the discharge lamp or in the lighting circuit, a first or second protection circuit stops the operation of the constant power supply circuit or the output of the constant power supply circuit to the lighting control is cut off. This makes it possible to cut off the power supply to the discharge lamp without complicating the circuit configuration or incurring a great increase in the cost of the circuit.

Further, according to the invention, while the power supply to the discharge lamp is being cut off by a second protection circuit, the power supply from a constant power supply circuit to a first protection circuit is cut off to thereby prohibit the operation of the first protection circuit, so that the circuit configuration can be simplified.

Still further, according to the invention, while the power supply to the discharge lamp is being cut off by a second protection circuit, by ignoring a signal to be sent to the constant power supply circuit in order to indicate that not only the power supply to the discharge lamp is to be cut off by the first protection circuit but also such cutoff condition of the power supply is to be held by the first protection circuit, there is eliminated the need to cut off the power supply line from the constant power supply circuit to the first protection circuit, thereby being able to prevent the circuit operation from being unstabilized due to the cutoff of the power supply.

What is claimed is:

1. A discharge lamp circuit, comprising:
    lighting control means for controlling the lighting of a discharge lamp,
    abnormal condition detect means for detecting an abnormal condition occurring in at least one of the discharge lamp and the discharge lamp lighting circuit, and
    a protection circuit for receiving a signal from the abnormal condition detect means, said protection circuit being operative to stop the supply of power to the discharge lamp, wherein:
    (a) said protection circuit comprises first protection means and second protection means and said first protection means and said second protection means are separate and distinct;
    (b) said first protection means being operative, when a permanent abnormal condition is detected in said discharge lamp or in said discharge lamp lighting circuit by said abnormal condition detect means, to cut off the power supply to the discharge lamp and hold said power supply cutoff condition;
    (c) said second protection means being operative, when a transient abnormal condition is detected in one of said discharge lamp and said discharge lamp lighting circuit by said abnormal condition detect means, first to cut off the power supply to said discharge lamp and, thereafter, when said transient abnormal condition is no longer detected, to remove said power supply cutoff condition to thereby resume the power supply to said discharge lamp; and
    (d) while the power supply to said discharge lamp is being cut off by said second protection means, the cut-off of the supply of power to said discharge lamp and the holding of said power supply cutoff condition by said first protection means are prohibited.

2. A discharge lamp lighting circuit as set forth in claim 1, further comprising a constant power supply circuit for generating a constant power supply voltage based on the power supply of said discharge lamp lighting circuit and for supplying said constant power supply voltage to said lighting control means, wherein,
    when an abnormal condition is detected in at least one of said discharge lamp and in said discharge lamp lighting circuit by said abnormal condition detect means, at least one of said first and second protection means stops the operation of said constant power supply circuit or cuts off the power supply output of said constant power supply circuit to said lighting control means to thereby cut off the supply of power to said discharge lamp.

3. A discharge lamp lighting circuit as set forth in claim 2, further comprising means operative, while the power supply to said discharge lamp is being cut off by said second protection means, to cut off the supply of power by said constant power supply circuit to said first protection means to thereby prohibit the operation of said first protection means.

4. A discharge lamp lighting circuit as set forth in claim 2, further comprising a signal masking means operative, while the power supply to said discharge lamp is being cut off by said second protection means, to block operation of said first protection means.

5. A discharge lamp lighting circuit as set forth in claim 4 wherein said signal masking means is operative to ignore a signal, which is sent to said constant power supply circuit so that the power supply to said discharge lamp can be cut off and said power supply cutoff condition can be held by said first protection means.

6. A discharge lamp lighting circuit as set forth in claim 2, wherein, wherein the same power supply voltage is supplied stably from the constant power supply circuit to the first and second protection units.

7. A discharge lamp lighting circuit as set forth in claim 5, wherein, wherein said signal masking means comprises a counter.

8. A discharge lamp lighting circuit as set forth in claim 5, wherein, wherein said signal masking means comprises an analog time constant circuit.

9. A discharge lamp lighting circuit as set forth in claim 5 wherein said signal masking means is disposed between said first and second protection units.

10. A discharge lamp lighting circuit for lighting a discharge lamp that is connectable to a power supply, said circuit comprising:

a lighting control unit that is connected to said lamp and said power supply and is operative to control the lighting of a discharge lamp, an abnormal condition detector that is operative to detect an abnormal condition occurring in at least one of the discharge lamp and in the discharge lamp lighting circuit, and a protection circuit for receiving a signal from the abnormal condition detector to thereby interrupt the supply of power by said power supply to the discharge lamp, wherein:

(a) said protection circuit comprises a first protection unit and second protection unit and said first protection unit and said second protection unit are separate and distinct;

(b) said first protection unit, when a permanent abnormal condition is detected in at least one of said discharge lamp or in said discharge lamp lighting circuit by said abnormal condition detector, being operative in a cutoff operation to interrupt the supply of power to the discharge lamp and to hold said cutoff condition for a predetermined time;

(c) said second protection unit, when a transient abnormal condition is detected in said discharge lamp or in said discharge lamp lighting circuit by said abnormal condition detector, being operative in a cutoff operation to first interrupt the supply of power to said discharge lamp and, thereafter, when said transient abnormal condition is no longer detected, to terminate said cutoff operation and to resume the supply of power to said discharge lamp; and (d) while the power supply to said discharge lamp is being cut off by said second protection unit, the cut-off of the power to said discharge lamp and the cutoff condition by said first protection unit are prevented.

11. A discharge lamp lighting circuit as set forth in claim 10, further comprising a constant power supply circuit for generating a constant power supply voltage for said discharge lamp lighting circuit and for supplying said constant power supply voltage to said lighting control unit, wherein, when an abnormal condition is detected in at least one of said discharge lamp or in said discharge lamp lighting circuit by said abnormal condition detector, at least one of said first protection unit and said second protection unit stops the operation of said constant power supply circuit or interrupts the power output of said constant power supply circuit to said lighting control circuit to thereby cut off the power supply to said discharge lamp.

12. A discharge lamp lighting circuit as set forth in claim 11, wherein, while the power supply to said discharge lamp is being cut off by said second protection unit, the supply of power by said constant power supply circuit to said first protection unit is cut off to thereby prohibit the operation of said first protection unit.

13. A discharge lamp lighting circuit as set forth in claim 11, wherein while the power supply to said discharge lamp is being cut off by said second protection unit, a signal, which is sent to said constant power supply circuit so that the power supply to said discharge lamp can be cut off and said power supply cutoff condition can be held by said first protection unit, is ignored.

14. A discharge lamp lighting circuit as set forth in claim 11, further comprising a signal masking means operative, while the power supply to said discharge lamp is being cut off by said second protection unit, to block operation of said first protection unit.

15. A discharge lamp lighting circuit as set forth in claim 14, wherein, wherein said signal masking means comprises a counter.

16. A discharge lamp lighting circuit as set forth in claim 15, wherein, wherein said signal masking means comprises an analog time constant circuit.

17. A discharge lamp lighting circuit as set forth in claim 14 wherein said signal masking means is disposed between said first and second protection units.

* * * * *